United States Patent
Ferguson

(10) Patent No.: US 9,600,768 B1
(45) Date of Patent: Mar. 21, 2017

(54) USING BEHAVIOR OF OBJECTS TO INFER CHANGES IN A DRIVING ENVIRONMENT

(71) Applicant: Google Inc., Mountain View, CA (US)

(72) Inventor: David I. Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 557 days.

(21) Appl. No.: 13/863,613

(22) Filed: Apr. 16, 2013

(51) Int. Cl.
*G06N 5/02* (2006.01)

(52) U.S. Cl.
CPC .................... *G06N 5/02* (2013.01)

(58) Field of Classification Search
None
See application file for complete search history.

(56) References Cited

U.S. PATENT DOCUMENTS

| | | | | |
|---|---|---|---|---|
| 5,636,038 | A * | 6/1997 | Lynt | A61F 9/08 340/4.12 |
| 8,063,797 | B1 * | 11/2011 | Sonnabend | G06K 9/00791 340/932.2 |
| 8,195,394 | B1 | 6/2012 | Zhu et al. | |
| 8,311,973 | B1 * | 11/2012 | Zadeh | G06N 7/02 706/62 |
| 8,825,350 | B1 * | 9/2014 | Robinson | G08G 1/0116 340/909 |
| 2003/0018428 | A1 * | 1/2003 | Knockeart | G01C 21/3415 342/357.31 |
| 2005/0278098 | A1 * | 12/2005 | Breed | B60R 21/0134 701/45 |
| 2007/0005609 | A1 * | 1/2007 | Breed | B60N 2/2863 |

(Continued)

FOREIGN PATENT DOCUMENTS

EA    EP 2 256 690 A1    12/2010

OTHER PUBLICATIONS

Thrun et al., "Stanley: The Robot that Won the DARPA Grand Challenge", Journal of Field Robotics 23(9), 661-692, (2006), (c) 2006 Wiley Periodicals, Inc., Published online in Wiley InterScience (www.interscience.wiley.com). o DOI: 10.1002/rob. 20147.*

(Continued)

*Primary Examiner* — Ilya Traktovenko
(74) *Attorney, Agent, or Firm* — Lerner, David, Littenberg, Krumholz & Mentlik, LLP

(57) ABSTRACT

An apparatus and method are disclosed for determining whether a driving environment has changed relative to a detailed map stored by an autonomous vehicle. An autonomous driving computer system of the autonomous vehicle may determine whether the driving environment has probably changed based on the location of one or more objects detected in the driving environment. The autonomous driving computer system may include various object models, each object model being associated with an object type, and where each object model defines one or more probability values that a given object type is expected (or not expected) to be found at a given location. By aggregating the various probability values resulting from the detection of objects in the driving environment, and then comparing the aggregated probability values with one or more probability threshold values, the autonomous driving computer system may predict or determine whether the driving environment has probably changed.

20 Claims, 9 Drawing Sheets

(56) References Cited

U.S. PATENT DOCUMENTS

| | | | |
|---|---|---|---|
| 2008/0027591 A1* | 1/2008 | Lenser | G05D 1/0251 701/2 |
| 2008/0040004 A1* | 2/2008 | Breed | B60R 21/0134 701/45 |
| 2008/0046150 A1* | 2/2008 | Breed | B60R 21/0134 701/45 |
| 2008/0243342 A1* | 10/2008 | Breed | B60R 21/0132 701/45 |
| 2010/0106356 A1* | 4/2010 | Trepagnier | G01S 17/023 701/25 |
| 2012/0083960 A1 | 4/2012 | Zhu et al. | |
| 2012/0218412 A1* | 8/2012 | Dellantoni | G01C 21/3602 348/148 |
| 2012/0245758 A1 | 9/2012 | Mizuta et al. | |
| 2012/0306850 A1* | 12/2012 | Balan | G06T 19/006 345/419 |

OTHER PUBLICATIONS

Gibson et al, "Detecting Motorcyclists and Bicyclists atIntersections", Public Roads, Publication Number: FHWA-HRT-10-004, Issue No. vol. 73 No. 6,Date: May/Jun. 2010.*

Hadsell et al,"Learning Long-Range Vision for Autonomous Off-Road Driving",Journal of Field Robotics 26(2), 120-144 (2009) © 2009 Wiley Periodicals, Inc., Published online in Wiley In.*

Tovar et al, "Planning exploration strategies for simultaneous localization and mapping", Robotics and Autonomous Systems 54 (2006) 314-331, Available online Jan. 31, 2006.*

Urmson et al,"Autonomous Driving in Urban Environments: Boss and the Urban Challenge", Journal of Field Robotics 25(8), 425-466 (2008), (c) 2008 Wiley Periodicals, Inc., Published online in Wiley InterScience (www.interscience.wiley.com). o DOI: 10.1002/rob. 20255.*

Ajof, "Towards Autonomous On-Road Driving via Multi-resolutional and Hierarchical Moving Object Prediction", Mobile Robots XVII, edited by Douglas W. Gage, Proceedings of SPIE vol. 5609 (SPIE, Bellingham, WA, 2004).*

Althoff et al, "Model-Based Probabilistic Collision Detection in Autonomous Driving", IEEE Transacilons on Intelligent Transportation Systems, vol. 10, No. 2, Jun. 2009.*

Bishop, "Intelligent Vehicle Applications Worldwide", Jan./Feb. 2000.*

Henderson et al, "Robust Autonomous Vehicles", DARPA Urban Challenge, Jun. 1, 2007, University of Utah.*

Jun et al,, "The Navigation of Autonomous Vehicles in Uncertain Dynamic Environments: A Case Study", Proceedings of the 41st IEEE, Conference on Decision and Control, Las Vegas, Nevada USA, Dec.*

Niehaus et al, "Probability-Based Decision Making for Automated Highway Driving", IEEE Transactions on Vehicular Technology, vol. 43, No. 3, Aug. 1994.*

* cited by examiner

USING BEHAVIOR OF OBJECTS TO INFER CHANGES IN A DRIVING ENVIRONMENT

BACKGROUND

Autonomous vehicles use various computing systems to aid in the transport of passengers from one location to another. Some autonomous vehicles may require some initial input or continuous input from an operator, such as a pilot, driver, or passenger. Other systems, such as autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are equipped with various types of sensors in order to detect objects in the surroundings. For example, autonomous vehicles may include lasers, sonar, radar, cameras, and other devices that scan and record data from the vehicle's surroundings. These devices in combination (and in some cases alone) may be used determine the location of the object in three-dimensional space.

The autonomous vehicle may rely on a digital map to navigate and operate in its driving environment. However, unexpected changes to the driving environment may occur. For example, the autonomous vehicle may be near an accident or a recent construction that has not yet been updated on the digital map. Accordingly, it may be difficult for the autonomous vehicle to navigate and operate in such circumstances.

BRIEF SUMMARY

Aspects of the disclosure pertain to detecting objects in a driving environment and determining the likelihood of those objects being at a particular location within that driving environment. The likelihoods are then used to determine whether the driving environment has changed relative to an electronic map of the driving environment.

In one aspect, an apparatus for determining whether for determining whether a driving environment has changed based on one or more object models is disclosed. In one embodiment, the apparatus includes a memory configured to store a plurality of object models, each object model defining one or more characteristics for an object detectable in a driving environment of an autonomous vehicle, and one or more processors in communication with the memory. The one or more processors may be configured to obtain sensor information corresponding to a detected object in the driving environment from one or more sensors of the autonomous vehicle and determine one or more object characteristics for the detected object based on the obtained sensor information. The one or more processors may also be configured to determine a location of the detected object based on the obtained sensor information and select an object model from the plurality of object models in the memory, the selected object model corresponding to the detected object based on the determined one or more object characteristics.

Furthermore, the one or more processors may be configured to determine a probability value associated with the detected object, the probability value corresponding to a probability of the detected object appearing at the determined location based on the selected object model, and compare the probability value with a probability threshold value. The one or more processors may then identify that the driving environment has changed when the probability value is less than the probability threshold value.

In another embodiment of the apparatus, the one or more object characteristics comprise a size of the detected object, a shape of the detected object, and a speed of the detected object.

In a further embodiment of the apparatus, the determined location of the detected object is a location relative to a current location of the autonomous vehicle.

In yet another embodiment of the apparatus, the object model is defined based on prior observations of a corresponding object type appearing at one or more locations of the driving environment.

In yet a further embodiment of the apparatus, the prior observations comprise maintaining a plurality of counts for the corresponding object type, wherein each count corresponds to a number of times the corresponding object type appears at the one or more locations with a predetermined object characteristic.

In another embodiment of the apparatus, the selected object model defines one or more characteristics for a corresponding object type, and the one or more processors are further configured to choose the selected object model based on a comparison of the determined object characteristics of the detected object with the defined one or more characteristics of the selected object model.

In a further embodiment of the apparatus, the one or more processors are further configured to determine a situation type from the obtained sensor information, the situation type identifying a driving situation encounterable by the autonomous vehicle, and determine the probability value based on referencing the selected object model with the determined situation type.

In yet another embodiment of the apparatus, the one or more processors determine the situation type by determining one or more situational characteristics from the obtained sensor information, wherein the one or more situational characteristics comprise object types for objects involved in the situation and object density for the objects involved in the situation, comparing the determined one or more situational characteristics with one or more situational characteristics of one or more situational object models stored in the memory, wherein each situational object model defines one or more characteristics expected to be found during a corresponding situation, and selecting a given one of the situational object models having the determined situation type based on the comparison of the determined one or more situational characteristics with the characteristics of the selected situational object model.

In yet a further embodiment of the apparatus, the one or more processors are further configured to determine one or more object characteristics for a plurality of detected objects based on obtained sensor information, determine a plurality of locations for each of the plurality of detected objects, determine a plurality of probability values, wherein each probability value of the plurality is associated with a corresponding object of the plurality of detected objects, and the plurality of probability values are determined by referencing one or more of the plurality of object models with one or more locations of the plurality of locations. The one or more processors may be further configured to aggregate the plurality of probability values into an aggregated probability value, wherein identifying whether the driving environment has changed is further based on the aggregated probability value being greater than or equal to the probability threshold value.

In another embodiment of the apparatus, the plurality of object models comprise at least one object model corresponding to a vehicle type and at least one object model corresponding to a non-vehicle object.

A method for determining whether a driving environment has probably changed is also disclosed. In one embodiment, the method includes obtaining, with one or more processors, sensor information corresponding to a detected object in the driving environment from one or more sensors of an autonomous vehicle, and determining, with the one or more processors, one or more object characteristics for the detected object based on the obtained sensor information. The method may also include determining, with the one or more processors, a location of the detected object based on the obtained sensor information, and selecting, with the one or more processors, an object model from a plurality of object models stored in a memory in communication with the one or more processors, wherein each object model defines one or more characteristics for an object detectable in a driving environment of the autonomous vehicle, and the selected object model corresponds to the detected object based on the determined one or more object characteristics.

The method may also include determining, with the one or more processors, a probability value associated with the detected object, the probability value corresponding to a probability of the detected object appearing at the determined location based on the selected object model, and comparing, with the one or more processors, the probability value with a probability threshold value. Furthermore, the method may include identifying, with the one or more processors, that the driving environment has changed when the probability value is less than the probability threshold value.

In another embodiment of the method, the one or more object characteristics comprise a size of the detected object, a shape of the detected object, and a speed of the detected object.

In a further embodiment of the method, the determined location of the detected object is a location relative to a current location of the autonomous vehicle.

In yet another embodiment of the method, the object model is defined based on prior observations of a corresponding object type appearing at one or more locations of the driving environment.

In yet a further embodiment of the method, the prior observations comprise maintaining a plurality of counts for the corresponding object type, wherein each count corresponds to a number of times the corresponding object type appears at the one or more locations with a predetermined object characteristic.

In another embodiment of the method, the selected object model defines one or more characteristics for a corresponding object type, the method further includes choosing, with the one or more processors, the selected object model based on a comparison of the determined object characteristics of the detected object with the defined one or more characteristics of the selected object model.

In a further embodiment of the method, the method includes determining a situation type from the obtained sensor information, the situation type identifying a driving situation encounterable by the autonomous vehicle, and determining the probability value based on referencing the selected object model with the determined situation type.

In yet another embodiment of the method, determining the situation type comprises determining one or more situational characteristics from the obtained sensor information, wherein the one or more situational characteristics comprise object types for objects involved in the situation and object density for the objects involved in the situation, comparing the determined one or more situational characteristics with one or more situational characteristics of one or more situational object models stored in the memory, wherein each situational object model defines one or more characteristics expected to be found during a corresponding situation, and selecting a given one of the situational object models having the determined situation type based on the comparison of the determined one or more situational characteristics with the characteristics of the selected situational object model.

In yet a further embodiment of the method, the method includes determining one or more object characteristics for a plurality of detected objects based on obtained sensor information, determining a plurality of locations for each of the plurality of detected objects, determining a plurality of probability values, wherein each probability value of the plurality is associated with a corresponding object of the plurality of detected objects and the plurality of probability values are determined by referencing one or more of the plurality of object models with one or more locations of the plurality of locations, and aggregating the plurality of probability values into an aggregated probability value, wherein identifying whether the driving environment has changed is further based on the aggregated probability value being greater than or equal to the probability threshold value.

In another embodiment of the method, the plurality of object models comprise at least one object model corresponding to a vehicle type and at least one object model corresponding to a non-vehicle object.

DETAILED DESCRIPTION

This disclosure provides for an apparatus and method directed to determining whether a driving environment has probably changed relative to an electronic map stored by an autonomous vehicle. In particular, this disclosure provides for an apparatus and method of using a previously defined object model to determine the probability of a detected objected appearing in a detected location, and then comparing the determined probability with a probability threshold to determine whether the driving environment has probably changed.

Figure 1:
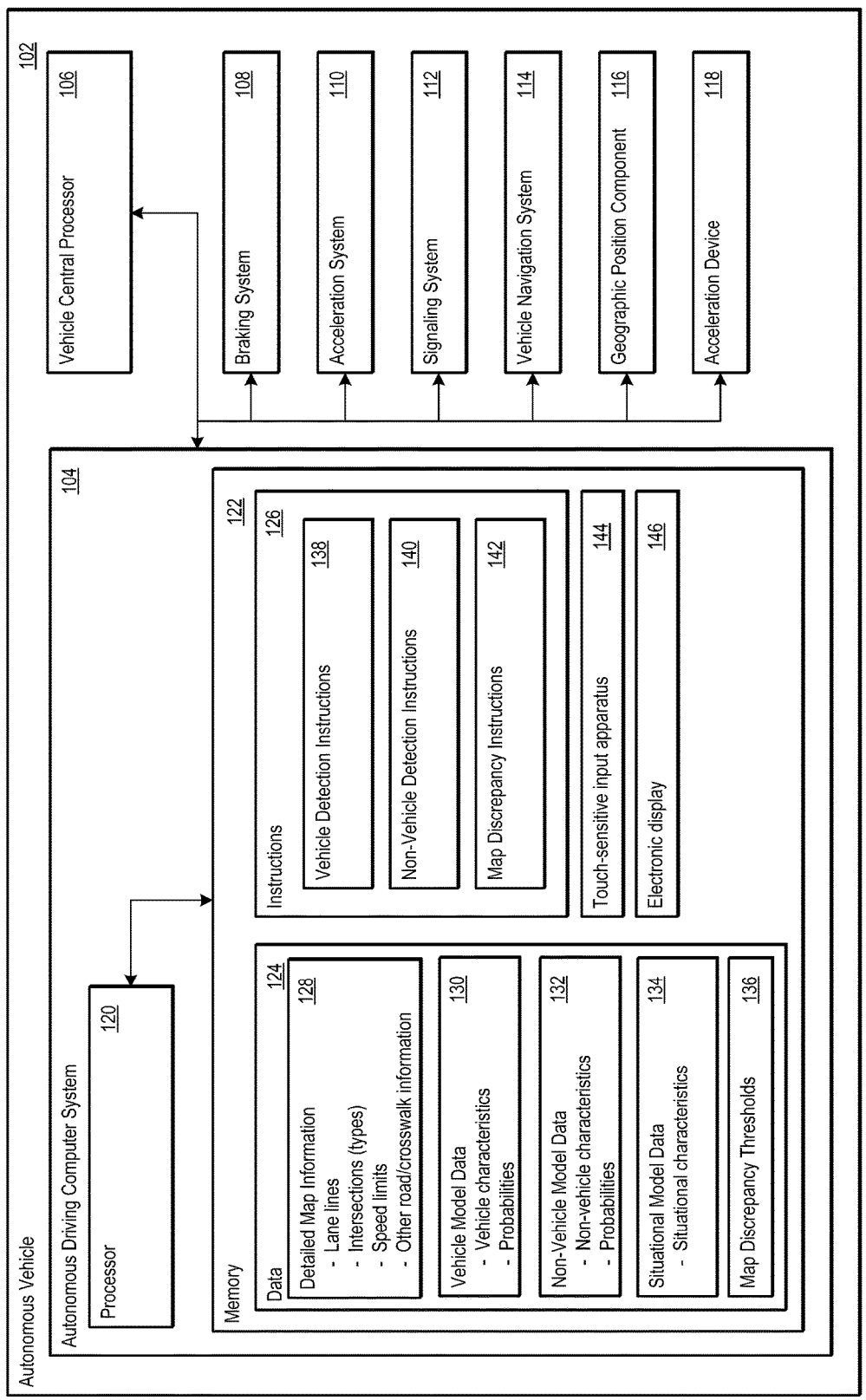
FIG. 1 illustrates an example of an autonomous vehicle configured to determine whether a driving environment has changed based on the characteristics of detected objects.

FIG. 1 illustrates an example of an autonomous vehicle 102 configured to determine whether a driving environment has probably changed according to aspects of the disclosure. In one embodiment, the autonomous vehicle 102 may include an autonomous driving computer system 104 in communication with one or more components 106-118.

While certain aspects of the disclosure are particularly useful in connection with specific types of vehicles, the autonomous vehicle 102 may be any type of autonomous vehicle including, but not limited to, cars, trucks, motorcycles, busses, boats, airplanes, helicopters, lawnmowers, recreational vehicles, amusement park vehicles, trams, golf carts, trains, and trolleys. The autonomous vehicle 102 may include one or more computers and/or processors, such as the autonomous driving computer system 104 and/or a vehicle central processor 106.

In one embodiment, the autonomous driving computer system 104 may include a processor 120 and a memory 122. The autonomous driving computer system 104 may also include other components typically present in a general purpose computer.

The memory 122 may store information accessible by the processor 120, such as instructions 126 and data 124 that may be executed or otherwise used by the processor 120. The memory 122 may be of any type of memory operative to store information accessible by the processor 120, including a computer-readable medium, or other medium that stores data that may be read with the aid of an electronic device. Examples of the memory 122 include, but are not limited, a hard-drive, a memory card, read-only memory ("ROM"), random-access memory ("RAM"), digital video disc ("DVD"), or other optical disks, as well as other write-capable and read-only memories. Systems and methods may include different combinations of the foregoing, whereby different portions of the instructions 126 and data 124 are stored on different types of media.

The data 124 may be retrieved, stored, or modified by processor 120 in accordance with the instructions 126. For instance, although the disclosed embodiments not limited by any particular data structure, the data 124 may be stored in computer registers, in a relational database as a table having a plurality of different fields and records, XML documents, flat files, or in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 124 may comprise any information sufficient to identify the relevant information, such as numbers, descriptive text, proprietary codes, references to data stored in other areas of the same memory or different memories (including other network locations) or information that is used by a function to calculate the relevant data.

The data 124 may include various types of data for determining whether a driving environment has changed. In one embodiment, the data 124 may include detailed map information 128, vehicle model data 130, non-vehicle model data 132, situational model data 134, and one or more map discrepancy thresholds 136. Combinations of the foregoing, where some data is included and other data is excluded, is also possible.

The detailed map information 128 may define one or more driving environments of the autonomous vehicle 102. The detailed map information 128 may include various maps that identify the shape and elevation of roadways, lane lines, intersections, crosswalks, speed limits, traffic signals, buildings, signs, real time traffic information, or other such objects and information. The detailed map information 128 may further include explicit speed limit information associated with various roadway segments. The speed limit data may be entered manually or scanned from previously taken images of a speed limit sign using, for example, optical-character recognition. In addition, the detailed map information 128 may include three-dimensional terrain maps incorporating one or more of the objects (e.g., crosswalks, intersections, lane lines, etc.) listed above.

The detailed map information 128 may also include lane marker information identifying the location, elevation, and shape of lane markers. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The autonomous driving computer system 104 may leverage one or more vehicle models to determine whether the driving environment has probably changed relative to the detailed map information 128. In this regard, the vehicle model data 130 may include one or more vehicle object models that define various characteristics about various types of vehicle. Vehicle types may include passenger vehicle, motorcycle, sport-utility vehicle, law enforcement vehicle, ambulance, compact vehicle, and other such vehicle types.

Characteristics defined by the vehicle object models may include vehicle shape, vehicle height, vehicle length, expected light reflectivity patterns for a given type of vehicle, expected radar reflectance for a given type of vehicle, vehicle image data for use in image recognition, and other such characteristics. As described below, when the autonomous driving computer system 104 has obtained sensor information from one or more of the sensors of the autonomous vehicle 102, the autonomous driving computer system 104 may determine one or more object characteristics from the obtained sensor information, and then compare the determine characteristics with characteristics defined by the vehicle model data 130 to determine the type of vehicles detected by the sensors.

In addition, the vehicle model data 130 may include one or more probabilities a given vehicle type is not expected at one or more locations. The locations may be specific to an actual geographic location (i.e., a location defined by a latitude and longitude coordinate), to a generic location type (e.g., shoulder of a highway, in the median of a two-lane road, within the center of a lane of a road, and so forth), and combinations of the foregoing.

For example, the vehicle model data 130 may define that the probability of a passenger vehicle not being in the shoulder of a highway is a high probability, such as 0.7, 0.8, or other probability. However, as a counter-example, the vehicle model data 130 may define that the probability of a law enforcement vehicle not being in the shoulder of a highway is a low probability, such as 0.2, 0.3, or other low probability.

In other words, the probabilities of the vehicle model data 130 may define the likelihood a given vehicle type is not expected at a given location, either specifically and/or generically. When a vehicle type is detected at a location where the probability of that vehicle type is not expected at that location is relatively high, this detection may be a strong signal that there may be a change in the driving environment. As discussed below, the probability associated with this event (i.e., detecting a vehicle type in a location where the vehicle type is not expected) may be used in determining whether a change in the driving environment has occurred.

Moreover, the probability a given vehicle type is not expected at a specific location may be different from the probability the given vehicle type is not expected at a generic location corresponding to the specific location. For example, the probability that a passenger vehicle is not expected in the shoulder of a U.S. Route 101 at 37.4° latitude, −122.09° longitude may be 0.8, whereas the probability that the passenger vehicle is not located in the shoulder of a generic highway may be 0.6.

In addition to vehicle model data 130, the data 124 may also include non-vehicle model data 132. The non-vehicle model data 132 may include one or more non-vehicle object models that define various characteristics about various types of non-vehicle object types, such as pedestrians, traffic cones, k-rail barriers, and other such non-vehicle object types. Characteristics defined by the non-vehicle object models may include shape information, height information, length information, expected light reflectivity patterns for a given type of non-vehicle object, expected radar reflectance for a given type of non-vehicle object, image data for use in image recognition of a non-vehicle object, and other such characteristics. As described below, when the autonomous driving computer system 104 has obtained sensor information from one or more of the sensors of the autonomous vehicle 102, the autonomous driving computer system 104 may cross-reference, such as by comparing or retrieving, the obtained sensor information with the non-vehicle model data 132 to determine the type of non-vehicle objects detected by the sensors.

In addition, the non-vehicle model data 132 may include one or more probabilities a given non-vehicle object type is not expected at one or more locations, generically or specifically. The locations may be specific to an actual geographic location (i.e., a location defined by a latitude and longitude coordinate), to a generic location type (e.g., shoulder of a highway, in the median of a two-lane road, within the crosswalk of a road, and so forth), and combinations of the foregoing.

For example, the non-vehicle model data 132 may define that the probability of a pedestrian object not being in the shoulder of a highway is a high probability, such as 0.7 or 0.8, that there is a change in the driving environment. However, as a counter-example, the non-vehicle model data 132 may define that the probability of a traffic cone not being in the shoulder of a highway is a low probability, such as 0.2 or 0.3. Thus, when pedestrian is detected in the shoulder of a highway, this event may be a strong signal that a change in the driving environment has occurred, but when the traffic cone is detected in the shoulder of the highway, this may be a lesser signal that a change in the driving environment has occurred.

In summary, the probabilities of the non-vehicle model data 132 may define the likelihood a given non-vehicle object type is not expected at a given location, either specifically and/or generically. Moreover, the probability a given non-vehicle object type is not expected at a specific location may be different from the probability the given vehicle type is not expected at a generic location corresponding to the specific location.

The data 124 may further include situational model data 134 for use by the autonomous driving computer system 104 in determining whether a driving environment has changed. The situational model data 134 may include one or more situational object models that define various characteristics of situations detectable by the autonomous driving computer system 104. The situational object models may include object models for various situation types, such as road construction, road accidents, heavy traffic, slow-moving traffic, non-moving traffic (e.g., as with a traffic jam), and other such situation types.

For each situation type, the situational object models may define various situational characteristics of the given situation, such as vehicle and/or non-vehicle density, expected vehicle speed, expected vehicle types, expected non-vehicle types, and so forth. For example, with a road construction situation type, the characteristics may be defined as slow-moving and dense traffic with one or more expected construction vehicle types. As another example, with an accident situation type, the characteristics may be defined as slow-moving and dense traffic, with an expected one or more passenger vehicle types, an expected one or more law enforcement vehicle types, and one or more pedestrian object types.

The autonomous driving computer system 104 may cross-reference the situational model data 134 with the vehicle model data 130 and/or the non-vehicle model data 132 to determine a probability value associated with a detected object that the driving environment has changed. For example, after having obtained sensor information from the one or more sensors of the autonomous vehicle 102, the autonomous driving computer system 104 may then compare the obtained sensor information with one or more situational object models to determine the situation type (e.g., accident, road construction, normal driving condition, etc.). Thereafter, the autonomous driving computer system 104 may cross-reference the corresponding object model of one or more detected objects with the situation type to determine one or more probability values associated with each of the detected one or more objects. For example, where the detected object is determined as a law enforcement vehicle, the situation type is determined as "accident," and the generic location type is determined as "highway shoulder," the associated probability value may be a high probability value (i.e., that there is a high likelihood that, given a law enforcement vehicle being in an accident situation type and located within or at a highway shoulder, that the driving environment has changed).

While the foregoing object models have been discussed as being separate from the detailed map information 128, the detailed map information 128 may also include one or more object models that define the probability of an object (vehicle and/or non-vehicle) not expected at a given location. For example, the detailed map information 128 may include one or more locations where a passenger vehicle is not expected, and cross-referencing these locations with a detected passenger vehicle object may yield a high probability that a change in the driving environment has occurred.

In yet another alternative, the detailed map information 128 may be implemented with a system of one or more rules, where the rules define the expected, or unexpected, locations of various object types. For example, a first rule may specify that "Cars shouldn't be sideways relative to the direction of travel" and a second rule may specify that "Pedestrians shouldn't be located on the shoulder of a highway." One or more of the rules may be associated with one or more probability values. In this alternative, the rule system may be substituted for, or used in conjunction with, one or more of the various types of model data 130-134.

The probabilities of the various model data 130-134 may be obtained from various sources and/or combination of sources. For example, the probabilities of the model data 130-134 may be defined based on past observations of object types at a given location, crowd-sourcing of objet types observed at a given location (e.g., multiple users may provide such data to a server, which is then retrieved by, or provided to, the autonomous driving computer system 104), current observations of vehicles by the autonomous driving computer system 104, from traffic data provided to the autonomous driving computer system 104, and from other such sources.

In addition to the detailed map information 128 and the model data 130-134, the data 124 may also include one or more map discrepancy thresholds 136. The map discrepancy thresholds 136 may include one or more probability threshold values that, when met or exceeded, signify that there may be a discrepancy between the driving environment and the detailed map information 128. In one embodiment, the map discrepancy thresholds 136 may include an overall probability threshold and one or more probability thresholds for each group of object types, such as a probability threshold for vehicle object types and a probability threshold for non-vehicle object types. The probability threshold for non-vehicle object types may be greater than the probability threshold for vehicle object types, and vice versa.

In addition, increasing the number of probability thresholds may increase the accuracy and/or granularity of when the autonomous driving computer system 104 determines that a change in the driving environment has probably occurred. For example, the map discrepancy thresholds 136 may include a law enforcement vehicle type probability threshold, a passenger vehicle probability threshold, a pedestrian probability threshold, and so forth. The types of probability thresholds may be adjusted or established by one or more operators of the autonomous vehicle 102.

The values of the probability thresholds may take on any value between 0 and 1 (e.g., 0.1, 0.2 etc.), inclusive. Furthermore, the values of the probability thresholds may be scaled or redefined to adjust the accuracy of determining when a change in the driving environment has occurred. For example, instead of having a value between 0 and 1, inclusive, the probability thresholds may also take any values between 0 and 100, inclusive. Yet further, the values of the probability thresholds may include values measured by the hundredths (e.g., 0.01), thousandths (e.g., 0.001), and so forth.

The processor 120 may execute one or more instructions 126 for determining whether a driving environment has changed based on obtained sensor information and the data 124. In general, the instructions 126 may be any set of instructions that may be executed directly (such as machine code) or indirectly (such as scripts) by the processor 120. For example, the instructions 126 may be stored as computer code on the computer-readable medium. In that regard, the terms "instructions" and "programs" may be used interchangeably herein. The instructions 126 may be stored in object code format for direct processing by the processor 120, or in any other computer language including scripts or collections of independent source code modules that are interpreted on demand or compiled in advance. Functions, methods and routines of the instructions 126 are explained in more detail below.

In one embodiment, the instructions 126 may include vehicle detection instructions 138, non-vehicle detection instructions 140, and map discrepancy instructions 142. The vehicle detection instructions 138 may be one or more instructions that instruct the processor 120 how to determine whether one or more detected objects are vehicle objects based on obtained sensor information. To determine whether any of the detected objects are vehicle objects, the vehicle detection instructions 138 may instruct the processor 120 to compare the obtained sensor information with the characteristics of the various vehicle object models stored as the vehicle model data 130. Based on this comparison, the processor 120 may determine whether one or more detected objects are vehicle objects and, further still, an associated vehicle type.

The non-vehicle detection instructions 140 may be one or more instructions that instruct the processor 120 how to determine whether one or more detected objects are non-vehicle objects based on obtained sensor information. To determine whether any of the detected objects are non-vehicle objects, the non-vehicle detection instructions 140 may instruct the processor 120 to compare the obtained sensor information with the characteristics of the various non-vehicle object models stored as the non-vehicle model data 132. Based on this comparison, the processor 120 may determine whether one or more detected objects are non-vehicle objects and, further still, an associated non-vehicle object type.

The map discrepancy instructions 142 may instruct the processor 120 how to determine whether the location and/or orientation of the determined object types indicate a probable change in the driving environment relative to the detailed map information 128. In one embodiment, the map discrepancy instructions 142 may instruct the processor 120 to retrieve or obtain a probability value for each of the detected objects based on the objects' type and location. As discussed previously, the vehicle model data 130 and the non-vehicle model data 132 may include various object models that include one or more probability values for a variety of object types and locations (e.g., generic locations and/or specific locations), and the processor 120 may reference these object models to obtain the corresponding probability values.

Alternatively or in addition, the processor 120 may also reference the situational model data 134 to identify a situation type based on the obtained sensor information, and cross-reference the model data 130-132 to obtain the various probability values. Further still, the detailed map information 128 may include these probability values for the various object types, and the processor 120 may retrieve or obtain these probability values based on the determined locations of the various detected objects and/or object types.

The map discrepancy instructions 142 may further instruct the processor 120 to aggregate or combine the obtain probability values. In one embodiment, aggregating or combining the obtained probability values may include one or more mathematical operations, such as addition, multiplication, division, and so forth, and may include one or more weighted coefficients (e.g., probability values for non-vehicle object types may be weighted differently than the probability values for the vehicle object types). The map discrepancy instructions 142 may then instruct the processor 120 to compare the probability values, including the combined probability value, with one or more map discrepancy thresholds 136. Should one or more of the map discrepancy thresholds 136 be met or exceeded (e.g., the combined probability value exceeds an overall probability threshold), the processor 120 may determine that the driving environment has probably changed relative to the detailed map information 128.

The processor 120 may be any conventional processor, such as a Complex Instruction Set Computing ("CISC") processor, a Reduced Instruction Set Computing ("RISC") processor, or any other such processor. Alternatively, the processor may be a dedicated device such as an applicant-specific integrated circuit ("ASIC"). Although FIG. 1 functionally illustrates the processor 120, the memory 122, and other elements of the autonomous driving computer system 104 as being within the same block, it will be understood by those of ordinary skill in the art that the processor 120 and the memory 122 may actually comprise multiple processors and memories that may or may not be stored within the same physical housing. For example, the memory 122 may be a hard drive or other storage media located in a housing different from that of the autonomous driving computer system 104. Accordingly, references to a processor or computer will be understood to include references to a collection of processors or computers or memories that may or may not operate in parallel. Rather than using a single processor to perform the acts described herein, some of the components, such as steering components and deceleration components, may each have their own processor that only performs calculations related to the component's specific function.

In various embodiments described herein, the processor 120 may be located remote from the autonomous vehicle 102 and may communicate with the autonomous vehicle 102 wirelessly. In other aspects, some of the processes described herein are executed on a processor disposed within the autonomous vehicle 102 and others by a remote processor, including taking the acts necessary to execute a single maneuver.

The autonomous driving computer system 104 may include all of the components normally used in connection with a computer, such as a central processing unit ("CPU"), a memory (e.g., RAM and internal hard drives) storing data 124 and instructions 126 such as an Internet browser or other software application, an electronic display 126 (e.g., a monitor having a screen, a small liquid crystal display ("LCD") touch-screen or any other electrical device that is operable to display information), one or more user input devices 124 (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

The vehicle may also include a geographic position component 116 in communication with the autonomous driving computer system 104 for determining the geographic location of the autonomous vehicle 102. For example, the geographic position component 116 may include a Global Positioning System ("GPS") receiver to determine the autonomous vehicle's 102 latitude, longitude and/or altitude position. Other location systems such as laser-based localization systems, inertial-aided GPS, or camera-based localization may also be used to identify the location of the vehicle. The location of the autonomous vehicle 102 may include an absolute geographical location, such as latitude, longitude, and altitude as well as relative location information, such as location relative to other vehicles immediately around it which can often be determined with less noise than absolute geographical location.

The geographic position component 116 may also include other devices in communication with the autonomous driving computer system 104, such as an accelerometer, gyroscope or another direction/speed detection device 118 to determine the direction and speed of the vehicle or changes thereto. By way of example only, the geographic position component 116 may determine its pitch, yaw or roll (or changes thereto) relative to the direction of gravity or a plane perpendicular thereto. The geographic position component 116 may also track increases or decreases in speed and the direction of such changes. The location and orientation data as set forth herein may be provided automatically to the user, the autonomous driving computer 104, the vehicle central processor 106, other computers and combinations of the foregoing.

The autonomous driving computer system 104 may control the direction and speed of the autonomous vehicle 102 by controlling various components. By way of example, if the autonomous vehicle 102 is operating in a completely autonomous mode, the autonomous driving computer system 104 may cause the autonomous vehicle 102 to accelerate via the acceleration system 110 (e.g., by increasing fuel or other energy provided to the engine), decelerate via the braking system 108 (e.g., by decreasing the fuel supplied to the engine or by applying brakes) and change direction (e.g., by turning the front two wheels). The autonomous driving computer system 104 may also control one or more systems, such as the signaling system 112, when controlling the acceleration system 110 and/or the braking system 108.

The autonomous driving computer system 104 may also control one or more status indicators, which may convey the status of the autonomous vehicle 102 and its components to a passenger. For example, the autonomous vehicle 102 may be equipped with an electronic display 126 for displaying information relating to the overall status of the vehicle, particular sensors, or information about or from the autonomous driving computer system 104. The electronic display 126 may display computer-generated images of the vehicle's surroundings including, for example, the status of the autonomous driving computer system 104, the autonomous vehicle 102 itself, roadways, intersections, as well as other objects and information.

The autonomous driving computer system 104 may use visual or audible cues to indicate whether it is obtaining valid data from one or more sensors, whether the it is partially or completely controlling the direction or speed of the autonomous vehicle 104 or both, such as whether there are any errors, etc. In addition, autonomous driving computer system 144 may also have external indicators which indicate whether, at the moment, a human or an automated system is in control of the vehicle, that are readable by humans, other computers, or both.

The autonomous driving computer system 104 may also communicate with other components of the autonomous vehicle 102. For example, autonomous driving computer system 104 may communicate with a vehicle central processor 106. The autonomous driving computer system 104 may also send and receive information from the various systems of the autonomous vehicle 102. Communicating with the various systems may include communicating with the braking system 108, the acceleration system 110, the signaling system 112, and the vehicle navigation system 114. Communications with these systems may facilitate the control of the movement, speed, etc. of the autonomous vehicle 102. In addition, when engaged, autonomous driving computer system 104 may control some or all of these functions of the autonomous vehicle 102 and thus be fully or partially autonomous. It will be understood that although various systems and the autonomous driving computer system 104 are shown within the autonomous vehicle 102, these systems and components may be external to the autonomous vehicle 102 or physically separated by large distances.

The autonomous vehicle 102 may include components for detecting objects external to it, such as other vehicles, obstacles in the roadway, traffic signals, signs, trees, etc. The detection system may include lasers, sonar, radar, cameras or any other detection devices. For example, where the autonomous vehicle 102 is a small passenger car, the small passenger car may include a laser mounted on the roof or other convenient location. In one aspect, the laser may measure the distance between the autonomous vehicle 102 and the object surfaces facing the autonomous vehicle 102 by spinning on its axis and changing its pitch. The autonomous vehicle 102 may also include various radar detection units, such as those used for adaptive cruise control systems. The radar detection units may be located on the front and back of the car as well as on either side of the front bumper. In another example, a variety of cameras may be mounted on the autonomous vehicle 102 at known distances from one another. In this manner, the parallax from the different images may be used to compute the distance to various objects captured by the one or more cameras. These sensors may assist the vehicle in responding to its environment to maximize safety for passengers as well as objects or people in the environment.

Figure 2:
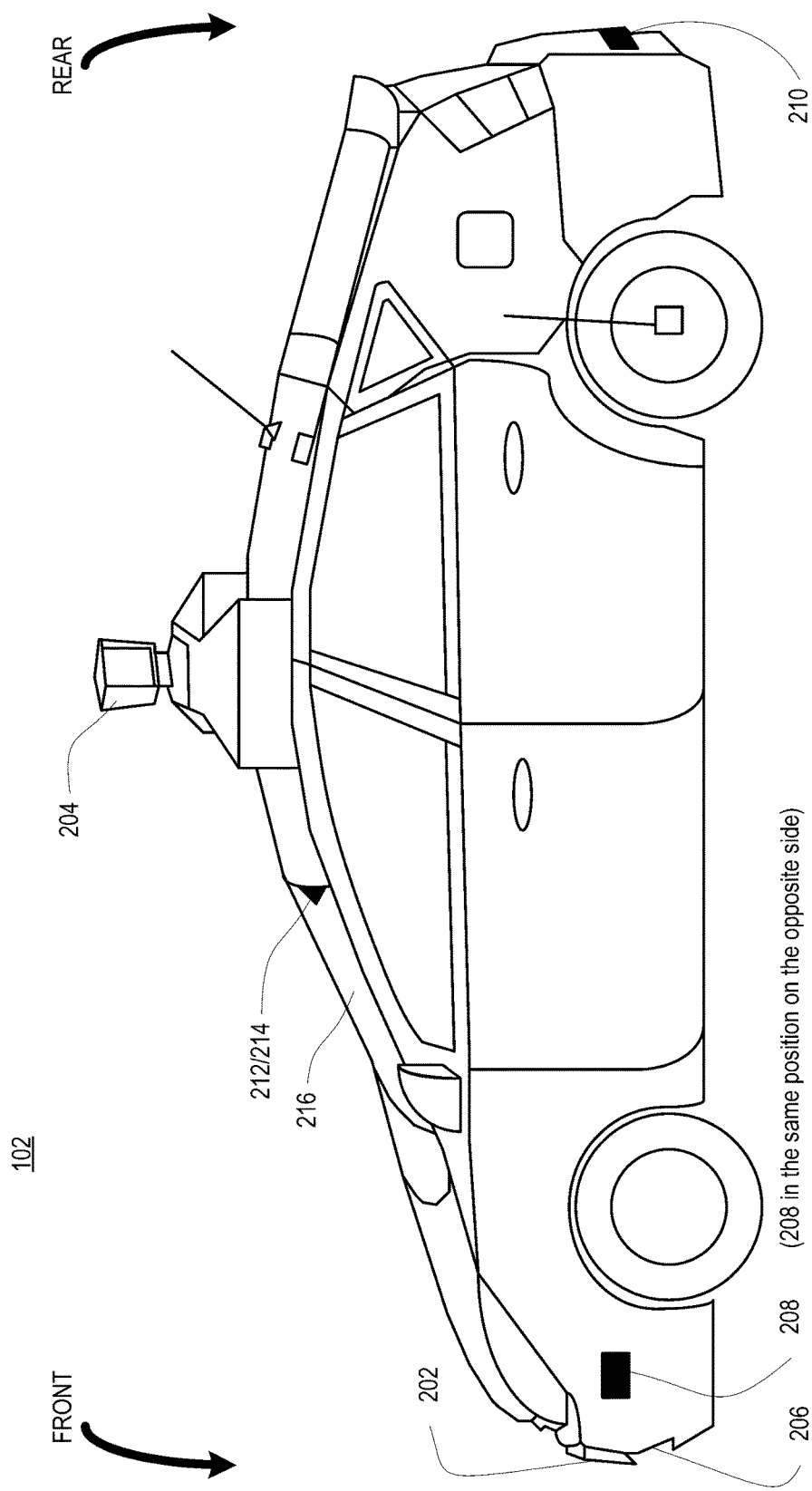
FIG. 2 illustrates an example of the placement of one or more sensors on the autonomous vehicle according to aspects of the disclosure.

FIG. 2 illustrates one example of the autonomous vehicle 102 and the placement of one or more external sensors. The autonomous vehicle 102 may include lasers 202 and 204, for example, mounted on the front and top of the autonomous vehicle 102, respectively. The laser 202 may have a range of approximately 150 meters, a thirty degree vertical field of view, and approximately a thirty degree horizontal field of view. The laser 204 may have a range of approximately 50-80 meters, a thirty degree vertical field of view, and a 360 degree horizontal field of view. The lasers 202-204 may provide the autonomous vehicle 102 with range and intensity information that the one or more processors 120,106 may use to identify the location and distance of various objects. In one aspect, the lasers 202-204 may measure the distance between the autonomous vehicle 102 and the object surfaces facing the autonomous vehicle 102 by spinning on their axes and changing their pitch.

The autonomous vehicle 102 may also include various radar detection units, such as those used for adaptive cruise control systems. The radar detection units may be located on the front and back of the car as well as on either side of the front bumper. As shown in the example of FIG. 2, the autonomous vehicle 102 includes radar detection units 206-210 located on the side (only one side being shown), front and rear of the vehicle. Each of these radar detection units 206-210 may have a range of approximately 200 meters for an approximately 18 degree field of view as well as a range of approximately 60 meters for an approximately 56 degree field of view.

In another example, a variety of cameras may be mounted on the autonomous vehicle 102. The cameras may be mounted at predetermined distances so that the parallax from the images of two or more cameras may be used to compute the distance to various objects. As shown in FIG. 2, the autonomous vehicle 102 may include two cameras 212-214 mounted under a windshield 216 near the rear view mirror (not shown).

The camera 212 may include a range of approximately 200 meters and an approximately 30 degree horizontal field of view, while the camera 214 may include a range of approximately 100 meters and an approximately 60 degree horizontal field of view.

Figure 3:
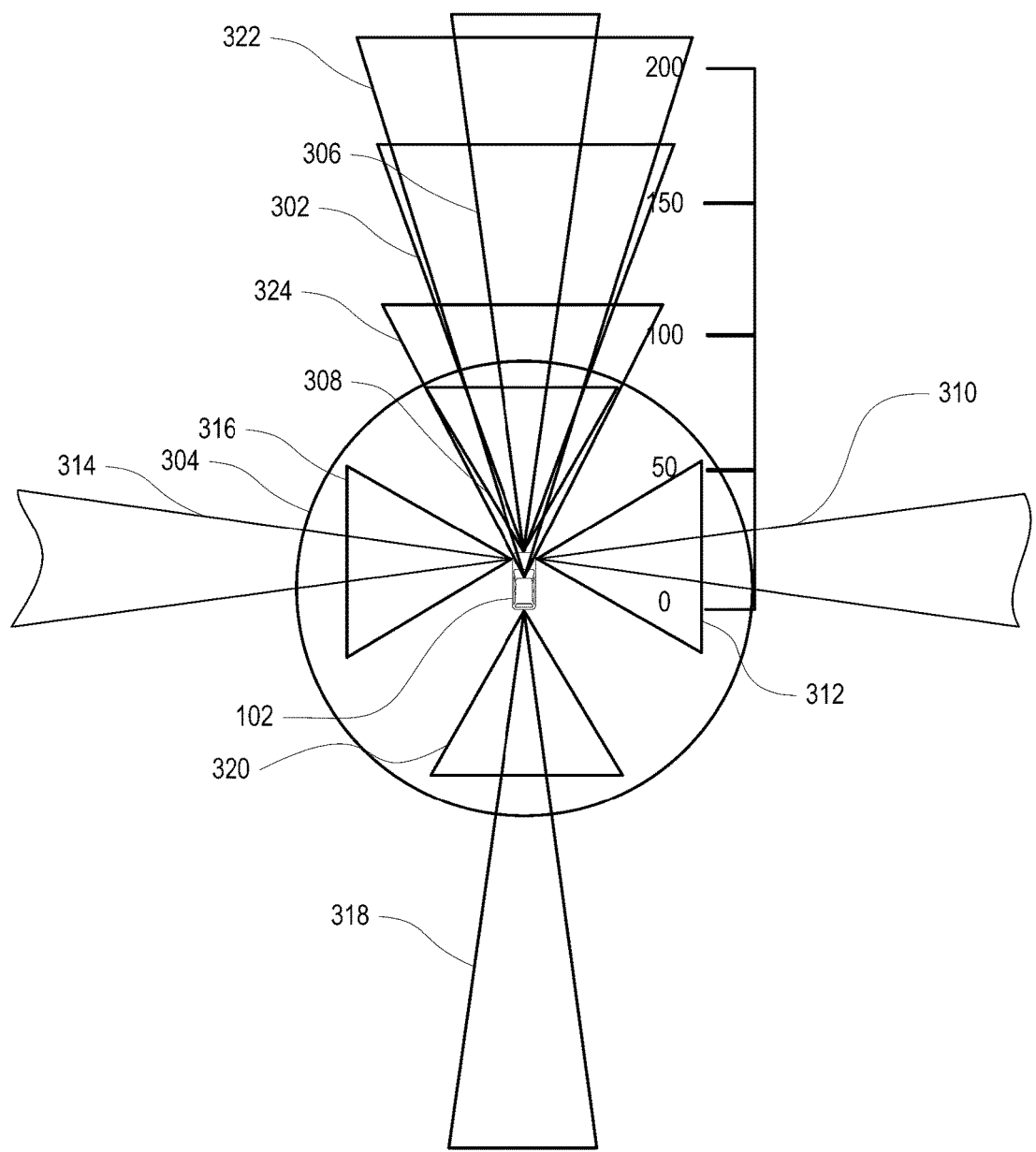
FIGS. 3-6 illustrate various views of the approximate sensor fields of the various sensors on the autonomous vehicle according to aspects of the disclosure.
Figure 4:
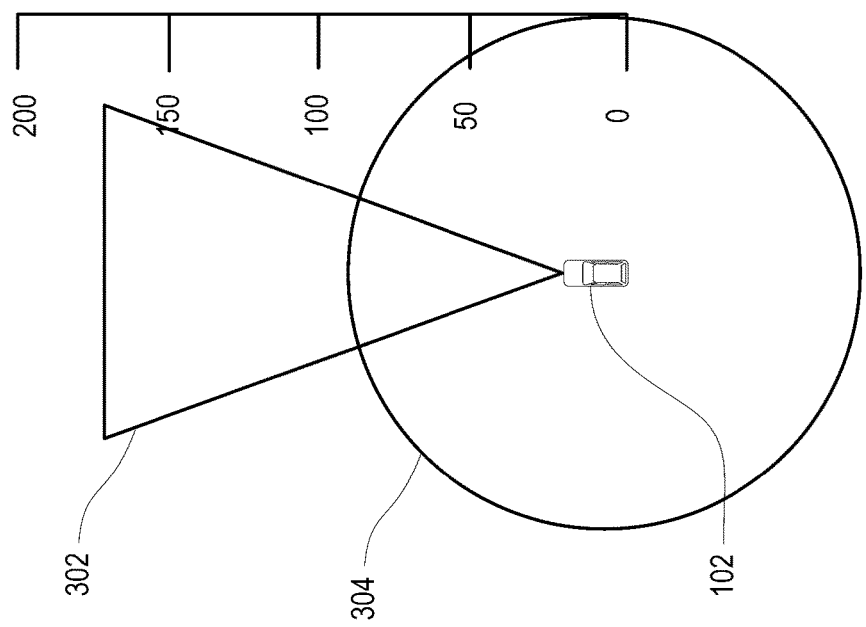

Each sensor may be associated with a particular sensor field in which the sensor may be used to detect objects. FIG. 3 is a top-down view of the approximate sensor fields of the various sensors. FIG. 4 depicts the approximate sensor fields 302 and 304 for the lasers 202 and 204, respectively based on the fields of view for these sensors. For example, the sensor field 302 includes an approximately 30 degree horizontal field of view for approximately 150 meters, and the sensor field 304 includes a 360 degree horizontal field of view for approximately 80 meters.

Figure 5:
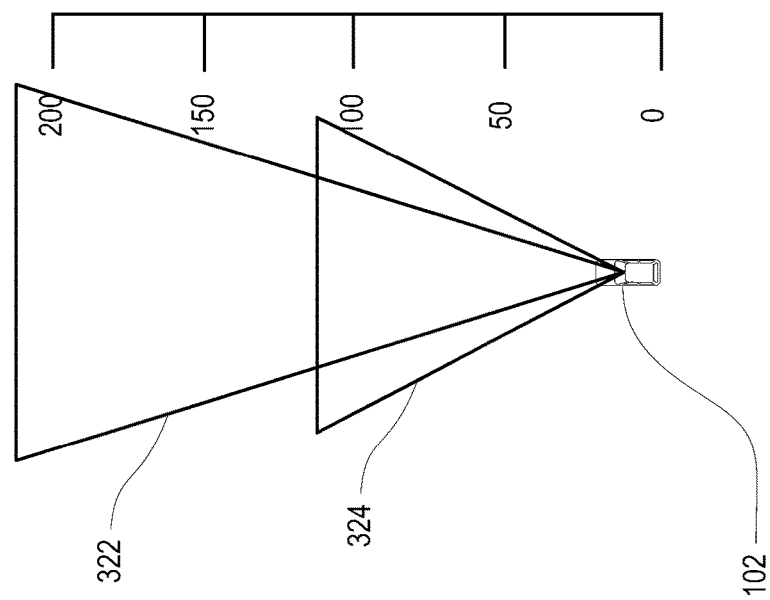

FIG. 5 depicts the approximate sensor fields 322-324 of cameras 212-214, respectively, based on the fields of view for these sensors. For example, the sensor field 330 of the camera 212 includes a field of view of approximately 30 degrees for approximately 200 meters, and sensor field 331 of the camera 214 includes a field of view of approximately 60 degrees for approximately 100 meters.

Figure 6:
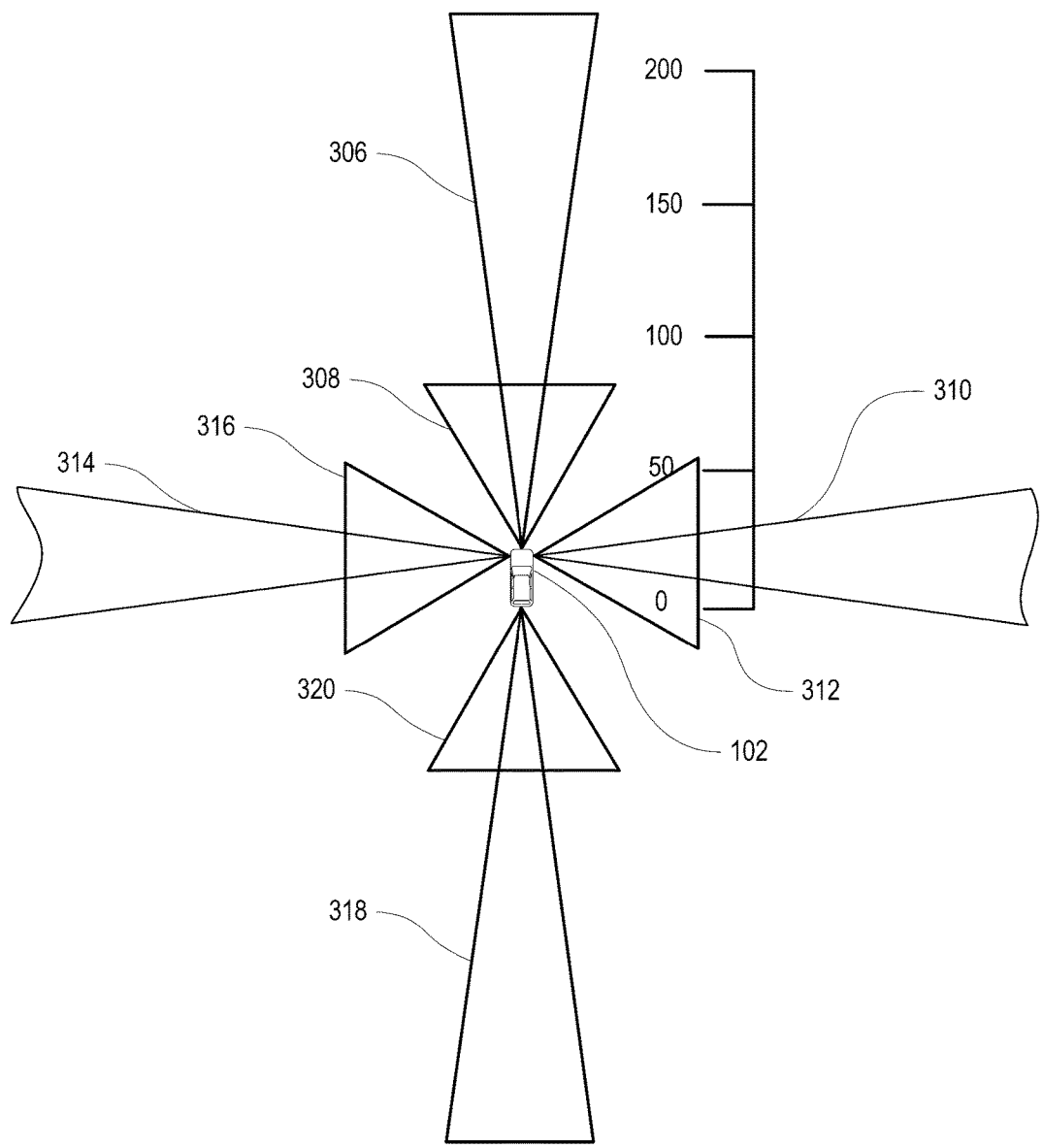

FIG. 6 depicts the approximate sensor fields 306-320 320A-323B and for radar detection units 206-210, respectively, based on the fields of view for these sensors. For example, the radar detection unit 206 includes sensor fields 306 and 308. The sensor field 306 includes an approximately 18 degree horizontal field of view for approximately 200 meters, and the sensor field 308 includes an approximately 56 degree horizontal field of view for approximately 80 meters. Similarly, the radar detection units 208-210 include the sensor fields 310-320. The sensor fields 310/314/318 include an approximately 18 degree horizontal field of view for approximately 200 meters, and the sensor fields 312/316/310 include an approximately 56 degree horizontal field of view for approximately 80 meters. The sensor fields 310 and 314 extend passed the edge of FIGS. 3 and 6.

In general, an autonomous vehicle 102 may include sonar devices, stereo cameras, a localization camera, a laser, and a radar detection unit each with different fields of view. The sonar may have a horizontal field of view of approximately 60 degrees for a maximum distance of approximately 6 meters. The stereo cameras may have an overlapping region with a horizontal field of view of approximately 50 degrees, a vertical field of view of approximately 10 degrees, and a maximum distance of approximately 30 meters. The localization camera may have a horizontal field of view of approximately 75 degrees, a vertical field of view of approximately 90 degrees and a maximum distance of approximately 10 meters. The laser may have a horizontal field of view of approximately 360 degrees, a vertical field of view of approximately 30 degrees, and a maximum distance of 100 meters. The radar may have a horizontal field of view of 60 degrees for the near beam, 30 degrees for the far beam, and a maximum distance of 200 meters. Hence, the autonomous vehicle 102 may be configured with any arrangement of sensors, and each of these sensors may capture one or more raw images for use by the autonomous driving computer system 104 to detect various objects near and around the autonomous vehicle 102.

The autonomous vehicle 102 may also include internal sensors for detecting or determining physiological information about its passengers and/or a driver of the autonomous vehicle 102. For example, autonomous vehicle 102 may include one or more weight sensors in the seats of the autonomous vehicle 102 to determine the weights of the one or more passengers. The autonomous vehicle 102 may also include sonar or other internal sensors for determining other physiological aspects of the passengers of the autonomous vehicle, such as heart rates, body temperatures, and other such physiological information.

In addition to the sensors described above, the autonomous driving computer system 104 may also use input from sensors found in non-autonomous vehicles. As examples, these sensors may include tire pressure sensors, engine temperature sensors, brake heat sensors, break pad status, tire tread sensors, fuel sensors, oil level and quality sensors, air quality sensors (for detecting temperature, humidity, or particulates in the air), etc.

The data provided by these sensors may be processed by the autonomous driving computer system 104 in real-time. In this context, the sensors may continuously update their output to reflect the environment being sensed at or over a range of time, and continuously or as demanded. The sensors may provide the updated output to the autonomous driving computer system 104 so that it can determine whether the autonomous vehicle's 102 then-current direction or speed should be modified in response to the sensed environment.

Figure 7:
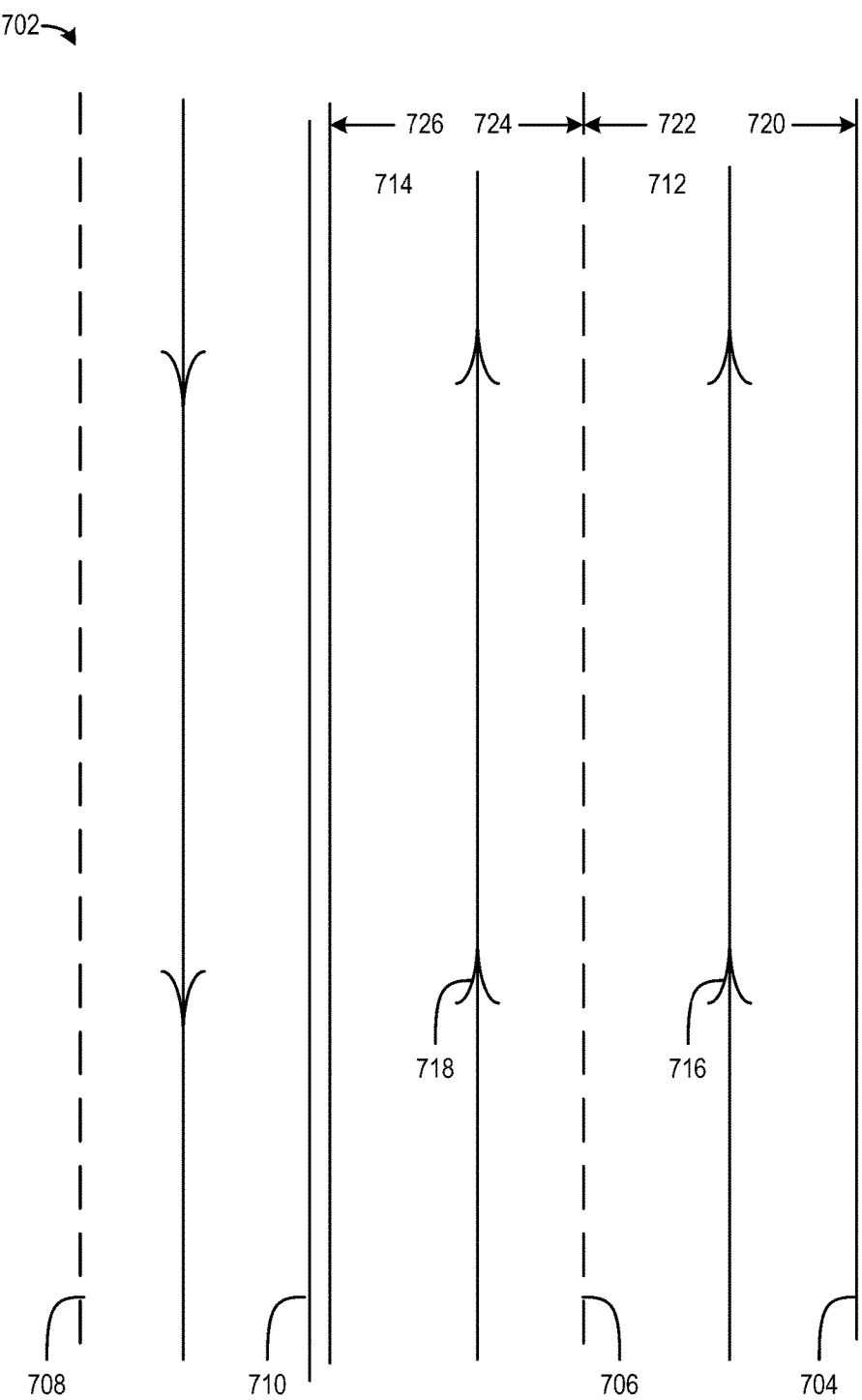
FIG. 7 illustrates an example of a portion of a detailed map that may represent the driving environment of the autonomous vehicle.

FIG. 7 illustrates an example of a portion of a detailed map 702 that may represent the driving environment of the autonomous vehicle 102. The detailed map 702 may be retrieved or referenced by the autonomous vehicle 102 based on a detected position of the autonomous vehicle 102. The detailed map 702 may be stored as part of the detailed map information 128.

The detailed map 702 may further represent a section of a road, such as highway, parkway, etc., and may include lane information such as information about a solid lane line 704, broken lane lines 706, 708, and double solid lane lines 710. These lane lines may define lanes 712 and 714. Each lane may be associated with a centerline rail 716, 716 which may indicate the direction in which a vehicle should generally travel in the respective lane. For example, a vehicle may follow centerline rail 718 when driving along lane 714. In this example, the lane 712 may be bounded by a right lane line 704 and a left lane line 706, and the lane 714 may be bounded by a right lane line 706 and a left lane line 710. The edges for lane 712 are edges 720, 722 while the edges for lane 714 are edges 724, 726.

In the example shown in FIG. 7, the detailed map information 128 may be depicted as an image-based map. However, the detailed map information 128 need not be entirely or completely image-based (e.g., raster-based). For example, the detailed map information 128 may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The detailed map information 128 may be loaded into the memory 122 of the autonomous vehicle 102 at a predetermined time. In one embodiment, the detailed map information 128 may be loaded into the memory 122 of the autonomous vehicle 102 on a daily basis. Alternatively, or in addition, the detailed map information 128 may be loaded into the memory 122 at other predetermined times, such as on a monthly or weekly basis.

In addition, and as discussed previously, the detailed map information 128 may be transferred, or received from, a map provider (not shown). Receiving detailed map information 128 from the map provider may also include receiving updated detailed map information, including any changes to the driving environment that have occurred since the detailed map information 128 was last transferred to the autonomous driving computer system 104. In one embodiment, the detailed map information 128 may be transferred, or received from, the map provider when the autonomous driving computer system 104 detects a change in the driving environment corresponding to the detailed map information 128.

Figure 8:
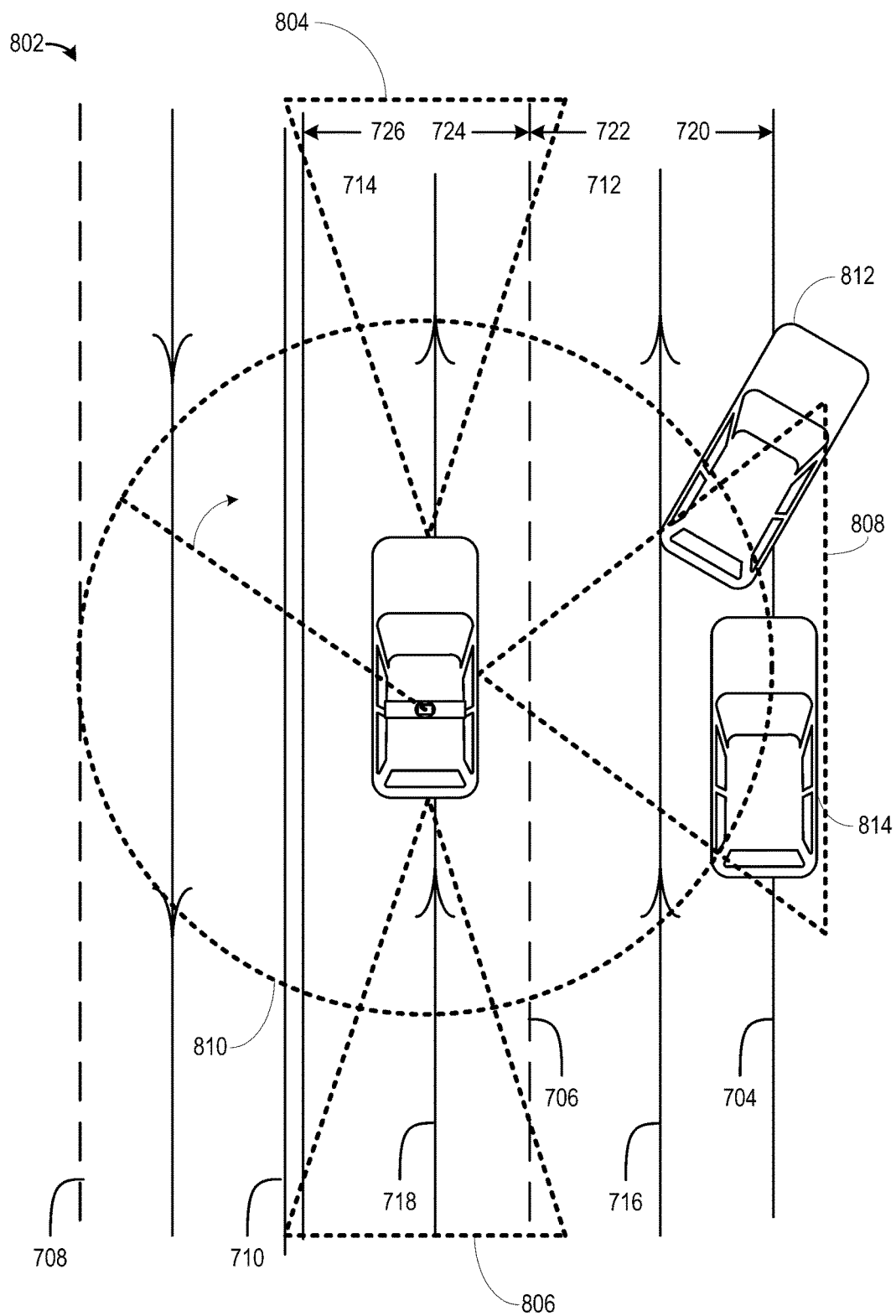
FIG. 8 illustrates a first scenario of the autonomous vehicle determining that the driving environment has probably changed based on detected vehicles.

FIG. 8 illustrates a first scenario 802 where the autonomous vehicle 102 may determine that the driving environment has probably changed based on detected objects and the location and/or orientation of those detected objects. The driving environment of the autonomous vehicle 102 in FIG. 8 may correspond to the detailed map information 702 shown in FIG. 7.

In summary, the autonomous vehicle 102 may detect various objects in the driving environment and determine characteristics associated with those objects, determine corresponding object models for the detected objects based on the determined object characteristics, determine and/or obtain one or more probability values based on the determined object models and the locations for the one or more detected objects, aggregate the probability values corresponding to the detected objects into an overall probability value, and then compare the overall probability value with a probability threshold to determine whether the driving environment has probably changed. The autonomous driving computer system 104 may also take a more nuanced or granular approach, such as by comparing object-specific probability values (e.g., a probability value for passenger vehicles, a probability vehicle for pedestrians, etc.) with one or more object-specific probability thresholds.

As shown in FIG. 8, the autonomous vehicle may detect a first object 812 and a second object 814 based on one or more sensor fields 804-810, such as sensor field 808 and sensor field 810. Using sensor information obtained from the detection of the objects 812-814, the autonomous driving computer system 104 may determine various object characteristics for the detected objects. The various object characteristics may include object height, object width, object length, object speed, object orientation, object reflectivity, and other such object characteristics.

The autonomous driving computer system 104 may then compare the determined object characteristics with the characteristics defined by the various vehicle object models and non-vehicle object models stored in the vehicle model data 130 and the non-vehicle model data 132, respectively. These comparisons may include comparing the determined characteristics with one or more height characteristics, length characteristics, reflectively characteristics, image-based characteristics, laser point cloud characteristics, and other such characteristics.

Based on these comparisons, the autonomous driving computer system 104 may determine that the vehicle object model corresponding to the detected objects 812-814 is a passenger vehicle object model. The autonomous driving computer system 104 may then determine the location and/or orientation of the detected objects 812-814, generically (e.g., "shoulder of a highway") and/or specifically (e.g., a specific latitude/longitude coordinate). Using the determined locations and/or orientations, the autonomous driving computer system 104 may reference the passenger vehicle object model for each of the detected objects 812-814 to retrieve the probability value that a passenger vehicle is not expected in the shoulder of a highway or at the location identified by the latitude and longitude coordinates. By way of example only, this probability value may be 0.7 for each of the detected objects 812-814.

In retrieving the probability values for each of the detected objects 812-814, the autonomous driving computer system 104 may alternatively, or in addition, reference situational model data 134 to determine a situation type from the obtained sensor information. For example, the autonomous driving computer system 104 may determine that the situation type is "accident" based on the fact that two passenger vehicles 812-814 are in close proximity to one another, the passenger vehicles 812-814 are located in the shoulder of the highway, and that the first vehicle 812 is slightly askew from the second vehicle 814. When the autonomous driving computer system 104 determines that the situation type is "accident," the autonomous driving computer system 104 may use the "accident" situation type value to retrieve corresponding probability values from the object models of the detected objects 812-814.

The autonomous driving computer system 104 may then aggregate the probability values for the detected objects 812-814 to obtain an aggregated probability value, and then compare the aggregated probability value with the overall probability threshold from the map discrepancy thresholds 136. The autonomous driving computer system 104 may also compare one or more object-specific probability values with one or more object-specific probability thresholds.

Where the aggregated probability is greater than or equal to the overall probability threshold, the autonomous driving computer system 104 may determine that the driving environment has probably changed relative to the detailed map information 128. Should the aggregated probability be less than the overall probability threshold, the autonomous driving computer system 104 may continue operating normally.

Figure 9:
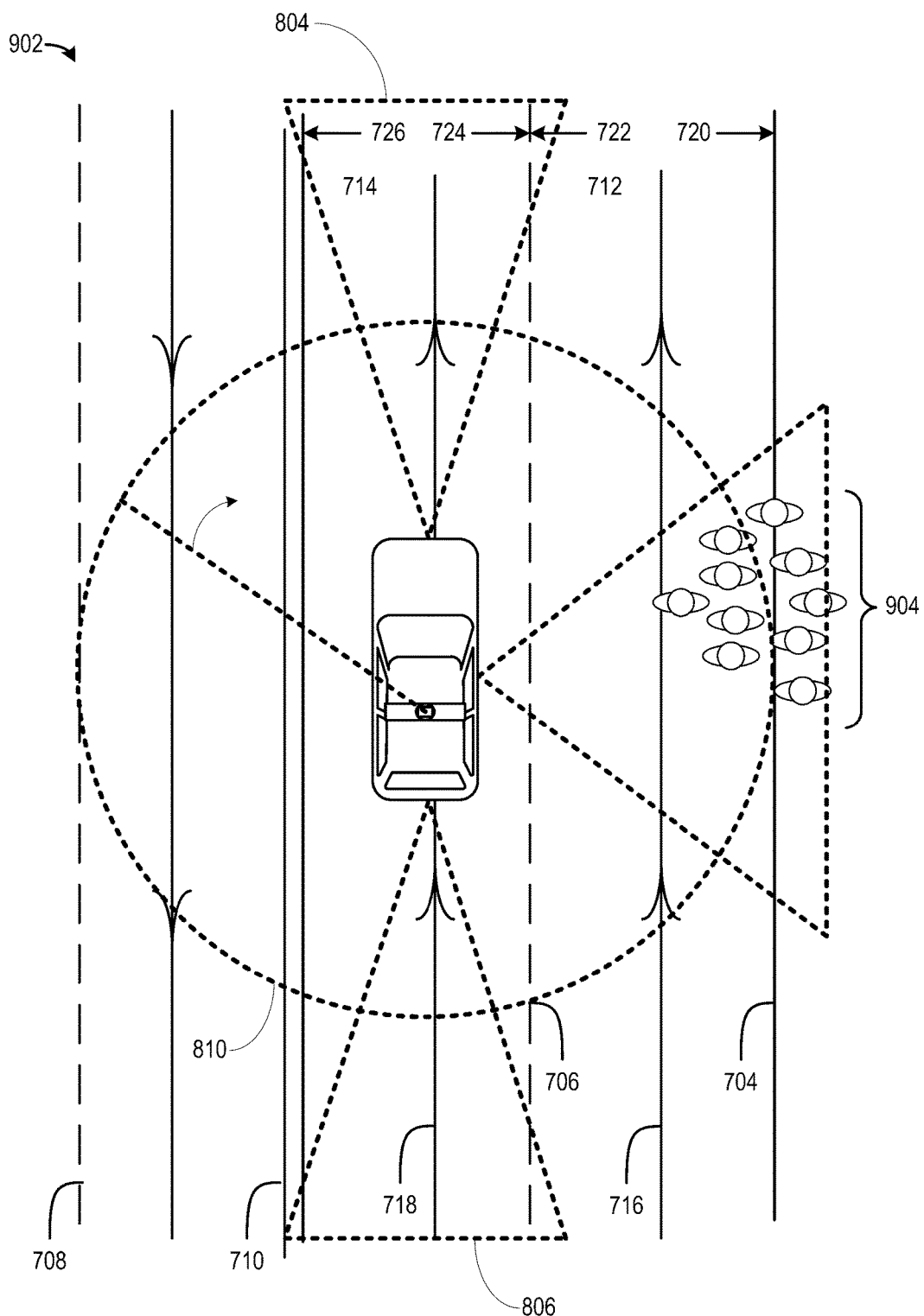
FIG. 9 illustrates a second scenario of the autonomous vehicle determining that the driving environment has probably changed based on detected pedestrians.

FIG. 9 illustrates a second scenario 902 where the autonomous vehicle 102 may determine that the driving environment has probably changed based on detected objects and the location and/or orientation of those detected objects. The driving environment of the autonomous vehicle 102 in FIG. 9 may correspond to the detailed map information 702 shown in FIG. 7.

As shown in FIG. 9, the autonomous vehicle may detect a group of objects 904 based on the sensor field 808 and sensor field 810. Using sensor information obtained from the detection of the object group 904 and/or the individual objects of the object group, the autonomous driving computer system 104 may determine various object characteristics (e.g., object height, object width, etc.), and compare one or more of these determined object characteristics with the characteristics defined by the various vehicle object models and non-vehicle object models stored in the vehicle model data 130 and the non-vehicle model data 132, respectively. These comparisons may include comparing the determined object characteristics with one or more height characteristics, length characteristics, reflectively characteristics, image-based characteristics, laser point cloud characteristics, and other such characteristics.

Based on these comparisons, the autonomous driving computer system 104 may determine that the non-vehicle object model corresponding to the detected objects 904 is a pedestrian object model. The autonomous driving computer system 104 may then determine the location and/or orientation of the detected objects 904, generically (e.g., "shoulder of a highway") and/or specifically (e.g., a specific latitude/longitude coordinate). Using the determined locations and/or orientations, the autonomous driving computer system 104 may reference the pedestrian object model for each of the detected objects 904 to retrieve the probability value that a pedestrian is not expected in the shoulder of a highway or at the location identified by the latitude and longitude coordinates. By way of example only, this probability value may be 0.8 for each of the detected objects 904.

In retrieving the probability values for each of the detected objects 904, the autonomous driving computer system 104 may alternatively, or in addition, reference situational model data 134 to determine a situation type from the obtained sensor information. For example, the autonomous driving computer system 104 may determine that the situation type is "parade" or "protest" based on the fact that multiple objects are in close proximity to each other the multiple objects are pedestrians, and the multiple objects are in the highway lane and the highway shoulder. When the autonomous driving computer system 104 determines that the situation type is "parade" or "protest," the autonomous driving computer system 104 may use the "parade" or "protest" situation type value to retrieve corresponding probability values from the object models of the detected objects 904.

The autonomous driving computer system 104 may then aggregate the probability values for the detected objects 904 to obtain an aggregated probability value, and then compare the aggregated probability value with an overall probability threshold from the map discrepancy thresholds 136. The autonomous driving computer system 104 may also compare one or more object-specific probability values with one or more object-specific probability thresholds.

As discussed previously, where the aggregated probability is greater than or equal to the overall probability threshold, the autonomous driving computer system 104 may determine that the driving environment has probably changed relative to the detailed map information 128. Should the aggregated probability be less than the overall probability threshold, the autonomous driving computer system 104 may continue operating normally.

Although FIGS. 8 and 9 illustrate different scenarios 802,902 with different object types, the autonomous vehicle 102 may encounter scenarios where vehicle and non-vehicle object types are present. In these scenarios, the autonomous driving computer system 104 may perform as previously discussed, namely, obtaining sensor information for a driving environment, determining characteristics for objects based on the obtained sensor information, determining object types for the detected objects based on the determined characteristics (e.g., by comparing the determined characteristics with the characteristics of the various object models), retrieving probability values for those object types, aggregating the probability values, and then comparing the aggregated probability values with one or more probability thresholds.

Figure 10:
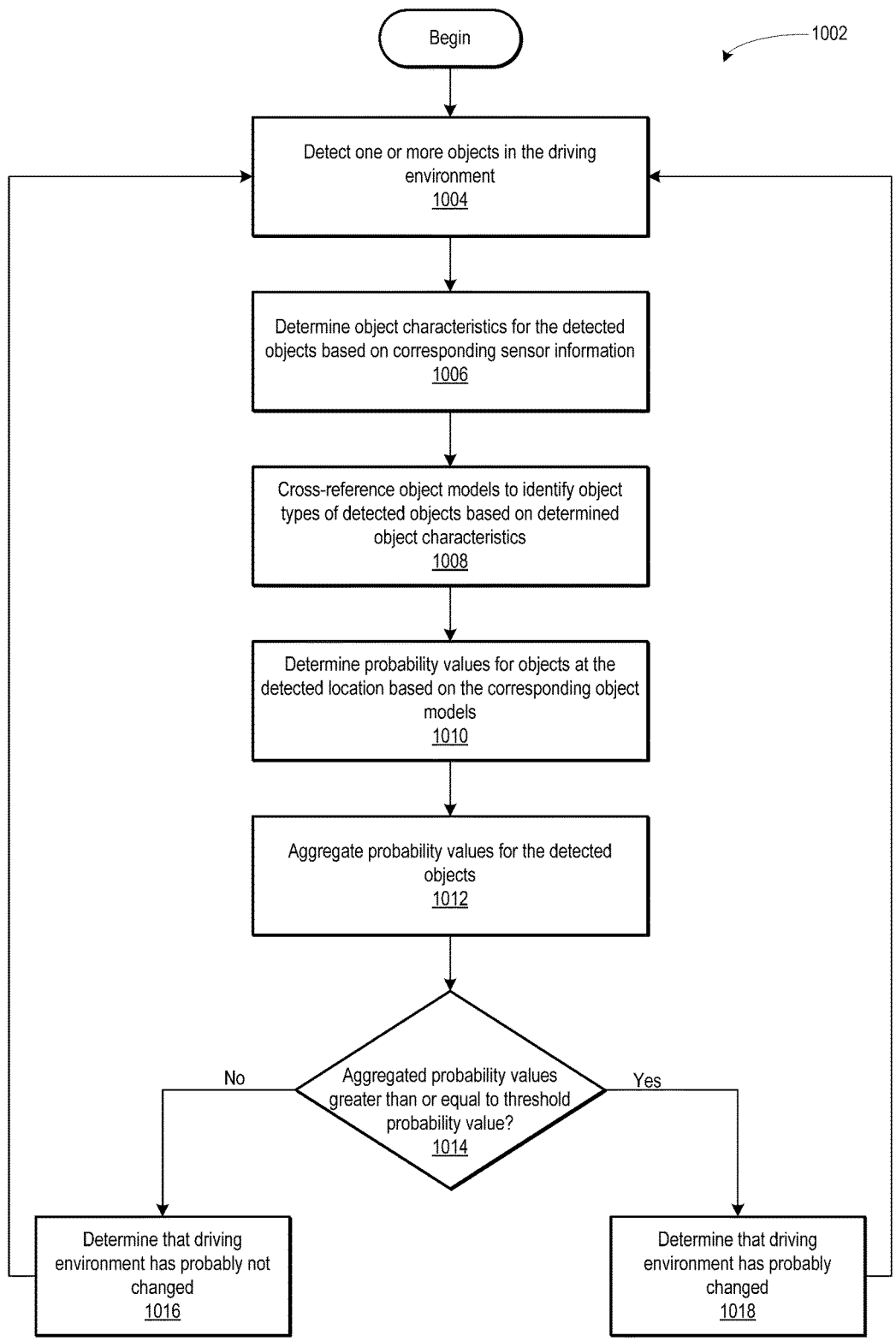
FIG. 10 an example of logic flow for determining whether a driving environment has probably changed based on the characteristics of detected objects.

FIG. 10 illustrates one example of logic flow 1002 for determining whether a driving environment has probably changed. Initially, the autonomous driving computer system 104 may obtain sensor information for a driving environment (Block 1004). The sensor information may be obtained from one or more sensors of the autonomous vehicle 102, such as the laser sensors 202,204, the radar detection units 206-210, cameras 212,214, and other such sensors.

The autonomous driving computer system 104 may then determine characteristics of various objects detected in the obtained sensor information (Block 1006). These characteristics may include an object's height, length, width, speed, reflectivity, appearance (e.g., for image recognition), and other such characteristics. The autonomous driving computer system 104 may then compare the determined characteristics for each of the detected objects with the characteristics of the various vehicle and non-vehicle object models (Block 1008). When the characteristics of a given object model are substantially similar to the determined characteristics of a given object, such as by being within a predetermined margin of error, the autonomous driving computer system 104 may determine that the given object is of the given object model type (e.g., a passenger vehicle, a law enforcement vehicle, a motorcycle, a pedestrian, etc.) (Block 1008).

The autonomous driving computer system 104 may then determine probability values for each of the detected objects given their corresponding object model type and the location of the detected object (Block 1010). As discussed previously, the location of a given object may be determined generically, such as "shoulder of a highway" or "within centerline of lane," or it may be determined specifically, such as being assigned a specific latitude and longitude coordinate. The location of a given object may be determined by identifying the object's location relative to the autonomous vehicle 102, and then cross-referencing that location with the detailed map information 128.

As discussed previously, each of the object models of the vehicle model data 130 and/or the non-vehicle model data 132 may define various probability values associated with one or more locations. These probability values may define the probability that an object of a given object type is not expected at a corresponding location. By referencing the object model type assigned to a detected object with the detected object's location, the autonomous driving computer system 104 may obtain a probability value for that object. Iterating through each of the detected objects in this manner, the autonomous driving computer system 104 may obtain a set of probability values, both for vehicle object types and non-vehicle object types.

The autonomous driving computer system 104 may then aggregate the various probability values (Block 1012). In one embodiment, aggregating the probability values may include aggregating all of the probability values together, regardless of the object type associated with a given probability value. In another embodiment, aggregating the probability values may include aggregating the probability values of the vehicle object types into a first probability value, and aggregating the probability values of the non-vehicle object types into a second probability value. Additional aggregated probability values may also be obtained, such as where the autonomous driving computer system 104 aggregates probability values for specific object types (e.g., the probability values of passenger vehicles, the probability values of motorcycles, etc.).

The autonomous driving computer system 104 may then compare the aggregated probability values with one or more probability threshold values (Block 1014). These comparisons ay include comparing a single, aggregated probability value with an overall probability threshold value and/or comparing multiple aggregated probability values with corresponding probability threshold values. Where one or more of the probability threshold values are met or exceeded, the autonomous driving computer system 104 may determine that the driving environment has probably changed relative to the detailed map information 128 (Block 1018). Where one or more of the probability threshold values are not met or not exceeded, the autonomous driving computer system 104 may determine that the driving environment has probably not changed relative to the detailed map information 128 (Block 1016).

As shown in FIG. 10, logic flow may then return to obtaining sensor information (Block 1004). However, the set of operations shown in logic flow 1002 may occur at predetermined intervals based on distance, time, or combinations thereof. Thus, in one embodiment, the operations 1004-1018 shown in FIG. 10 may occur every two minutes, every five minutes, every 10 feet, every 100 feet, and at other such intervals.

In this manner, the autonomous driving computer system 104 increases the likelihood that a change in driving environment is detected. As changes to a driving environment may occur prior to updates to the detailed map information of the autonomous vehicle, detecting such changes beforehand increases the overall safety of a passenger or user operating the autonomous vehicle 102. When such changes are detected, the autonomous vehicle 102 may operate in a cautionary manner and even return control of the vehicle 102 to a passenger or operator of the vehicle. Being able to react in such a manner is useful to an autonomous vehicle 102 because unknown changes in a driving environment present a heightened level of risk for operating in the driving environment.

Although aspects of this disclosure have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of this disclosure as defined by the appended claims. Furthermore, while certain operations and functions are shown in a specific order, they may be performed in a different order unless it is expressly stated otherwise.

The invention claimed is:

1. A system comprising:
a memory configured to store map information for a driving environment of a vehicle and a plurality of object models, each object model being associated with a particular type of vehicle and defining probabilities of not detecting a vehicle of the particular type at various map locations in the driving environment of an autonomous vehicle, wherein the plurality of object models include models associated with particular types of objects including—a passenger vehicle object type; and
one or more processors in communication with the memory, the one or more processors configured to:
  receiving the map information from a map provider;
  maneuver the vehicle in the driving environment using the map information;
  while maneuvering the vehicle, obtain sensor information corresponding to a detected object in the driving environment from one or more sensors of the autonomous vehicle;
  determine characteristics of the detected object based on the obtained sensor information;
  determine a location of the detected object based on the obtained sensor information;
  select an object model from the plurality of object models associated with a particular type of vehicle corresponding to the determined characteristics of the detected object such that the selected object model is the object model associated with the passenger vehicles object type;
  use the defined probabilities of the selected object model to determine a probability value defining a likelihood of a vehicle of the determined type of vehicle appearing at the determined location, wherein the location of the detected object corresponds to a shoulder of a particular highway in the map information, and the probability value further defines a likelihood of a vehicle of the determined type of vehicle appearing on a shoulder of a generic highway;

compare the probability value with a probability threshold value; and identify that the driving environment has changed from the map information when the probability value is less than the probability threshold value.

2. The system of claim 1, wherein the selected object model is defined based on prior observations of objects of the particular object type associated with the selected object model appearing at one or more locations of the driving environment.

3. The system of claim 2, wherein the prior observations comprise maintaining a plurality of counts for the objects of the particular object type associated with the selected object model, wherein each count corresponds to a number of times objects of the particular object type associated with the selected object model and having a predetermined object characteristic previously appeared at the one or more locations.

4. The system of claim 1, wherein the one or more processors are further configured to:

determine a situation type from the obtained sensor information, the situation type identifying a driving situation encounterable by the autonomous vehicle corresponding to a vehicular accident; and determine the probability value further based on the situation type.

5. The system of claim 4, wherein the one or more processors determine the situation type by:

determining one or more situational characteristics from the obtained sensor information, wherein the one or more situational characteristics comprise object types for objects involved in the situation and object density for the objects involved in the situation;

comparing the determined one or more situational characteristics with one or more situational characteristics of one or more situational object models stored in the memory, wherein each situational object model defines one or more characteristics expected to be found during a corresponding situation; and selecting a given one of the situational object models having the determined situation type based on the comparison of the determined one or more situational characteristics with the characteristics of the selected situational object model.

6. The system of claim 1, wherein the one or more processors are further configured to:

determine one or more object characteristics for a plurality of detected objects based on obtained sensor information;

determine a plurality of locations for each of the plurality of detected objects;

determine a plurality of probability values, wherein:

each probability value of the plurality is associated with a corresponding object of the plurality of detected objects; and the plurality of probability values are determined by referencing one or more of the plurality of object models with one or more locations of the plurality of locations; and aggregate the plurality of probability values into an aggregated probability value;

wherein identifying whether the driving environment has changed is further based on the aggregated probability value being greater than or equal to the probability threshold value.

7. The system of claim 1, wherein the plurality of object models comprise at least one object model associated with a particular object type being a vehicle object type and at least one object model associated with a particular object type being a non-vehicle object type.

8. The system of claim 1, wherein when the driving environment is identified to have changed from the map information, the one or more processors are further configured to retrieve updated map information including changes to the driving environment from the map information.

9. A method comprising:

maneuvering, with one or more processors, a vehicle in a driving environment using map information for the driving environment of the vehicle;

the vehicle, wherein the detected object is a pedestrian;

determining, with the one or more processors, one or more object characteristics for the detected object based on the obtained sensor information;

determining, with the one or more processors, a location of the detected object based on the obtained sensor information;

selecting, with the one or more processors, an object model from a plurality of object models, wherein:

each object model of the plurality of object models is associated with a particular type of object and defining probabilities of not detecting an object of the particular type of object at various map locations in the driving environment of an autonomous vehicle, wherein the plurality of object models include models associated with particular types of objects including at least a pedestrian type of object, and the selected object model is associated with a particular type of object corresponding to the one or more object characteristics for the detected object such that the selected object model is the object model associated with the pedestrian type of object;

determine a probability value defining a likelihood of an object of the type of the detected object appearing at the determined location using the defined probabilities of the selected object model, the location of the detected object corresponds to a centerline of a particular lane of the map information, and the probability value further defines a likelihood of a pedestrian appearing within a centerline of a lane;

comparing, with the one or more processors, the probability value with a probability threshold value; and identifying, with the one or more processors, that the driving environment has changed from the map information when the probability value is less than the probability threshold value.

10. The method of claim 9, wherein the selected object model is defined based on prior observations of objects of the particular object type associated with the selected object model appearing at one or more locations of the driving environment.

11. The method of claim 10, wherein the prior observations comprise maintaining a plurality of counts for objects of the particular object type associated with the selected object model, wherein each count corresponds to a number of times the objects of the particular object type associated with the selected object model and with a predetermined object characteristic have previously appeared at the one or more locations.

12. The method of claim 9, further comprising:
  determining a situation type from the obtained sensor information, the situation type identifying a driving situation encounterable by the autonomous vehicle; and
  determining the probability value based on referencing the selected object model with the determined situation type.

13. The method of claim 12, wherein determining the situation type comprises:
  determining one or more situational characteristics from the obtained sensor information, wherein the one or more situational characteristics comprise object types for objects involved in the situation and object density for the objects involved in the situation;
  comparing the determined one or more situational characteristics with one or more situational characteristics of one or more situational object models stored in the memory, wherein each situational object model defines one or more characteristics expected to be found during a corresponding situation; and
  selecting a given one of the situational object models having the determined situation type based on the comparison of the determined one or more situational characteristics with the characteristics of the selected situational object model.

14. The method of claim 9, further comprising:
  determining one or more object characteristics for a plurality of detected objects based on obtained sensor information;
  determining a plurality of locations for each of the plurality of detected objects;
  determining a plurality of probability values, wherein:
    each probability value of the plurality is associated with a corresponding object of the plurality of detected objects; and
    the plurality of probability values are determined by referencing one or more of the plurality of object models with one or more locations of the plurality of locations; and
  aggregating the plurality of probability values into an aggregated probability value;
  wherein identifying whether the driving environment has changed is further based on the aggregated probability value being greater than or equal to the probability threshold value.

15. The method of claim 9, wherein the plurality of object models comprise at least one object model associated with a particular object type being a vehicle object type and at least one object model associated with a particular object type being a non-vehicle object type.

16. A method comprising:
  maneuvering, with one or more processors, a vehicle in a driving environment using map information for the driving environment of the vehicle;
  while maneuvering the vehicle, obtaining, with the one or more processors, sensor information corresponding to a detected object in the driving environment from one or more sensors of an autonomous vehicle, wherein the detected object is a pedestrian;
  determining, with the one or more processors, one or more object characteristics for the detected object based on the obtained sensor information;
  determining, with the one or more processors, a location of the detected object based on the obtained sensor information;
  selecting, with the one or more processors, an object model from a plurality of object models, wherein:
    each object model of the plurality of object models is associated with a particular type of object and defining probabilities of not detecting an object of the particular type of object at various map locations in the driving environment of an autonomous vehicle, wherein the plurality of object models include models associated with particular types of objects including a pedestrian type of object, and
    the selected object model is associated with a particular type of object corresponding to the one or more object characteristics for the detected object such that the selected object model is the object model associated with the pedestrian type of object;
  determine a probability value defining a likelihood of an object of the type of the detected object appearing at the determined location using the defined probabilities of the selected object model, the location of the detected object corresponds to a shoulder of a particular highway in the map information, and the probability value further defines a likelihood of a pedestrian appearing on a shoulder of a generic highway;
  comparing, with the one or more processors, the probability value with a probability threshold value; and
  identifying, with the one or more processors, that the driving environment has changed from the map information when the probability value is less than the probability threshold value.

17. The method of claim 16, wherein the selected object model is defined based on prior observations of objects of the particular object type associated with the selected object model appearing at one or more locations of the driving environment.

18. The method of claim 17, wherein the prior observations comprise maintaining a plurality of counts for objects of the particular object type associated with the selected object model, wherein each count corresponds to a number of times the objects of the particular object type associated with the selected object model and with a predetermined object characteristic have previously appeared at the one or more locations.

19. The method of claim 16, further comprising:
  determining a situation type from the obtained sensor information, the situation type identifying a driving situation encounterable by the autonomous vehicle; and
  determining the probability value based on referencing the selected object model with the determined situation type.

20. The method of claim 19, wherein determining the situation type comprises:
  determining one or more situational characteristics from the obtained sensor information, wherein the one or more situational characteristics comprise object types for objects involved in the situation and object density for the objects involved in the situation;
  comparing the determined one or more situational characteristics with one or more situational characteristics of one or more situational object models stored in the memory, wherein each situational object model defines one or more characteristics expected to be found during a corresponding situation; and
  selecting a given one of the situational object models having the determined situation type based on the comparison of the determined one or more situational characteristics with the characteristics of the selected situational object model.

* * * * *

UNITED STATES PATENT AND TRADEMARK OFFICE
CERTIFICATE OF CORRECTION

PATENT NO. : 9,600,768 B1  
APPLICATION NO. : 13/863613  
DATED : March 21, 2017  
INVENTOR(S) : David I. Ferguson It is certified that error appears in the above-identified patent and that said Letters Patent is hereby corrected as shown below:

In the Claims

Column 22, Line 19:
Claim 9 "the vehicle, wherein the detected object is a pedestrian"; should read -- while maneuvering the vehicle, obtaining, with the one or more processors, sensor information corresponding to a detected object in the driving environment from one or more sensors of the vehicle, wherein the detected object is a pedestrian; --.

Signed and Sealed this  
Seventeenth Day of December, 2019

Andrei Iancu  
*Director of the United States Patent and Trademark Office*